United States Patent Office 2,766,234
Patented Oct. 9, 1956

2,766,234

6-ETHYLMERCURY-THIO-1,3,5 TRIAZINES

Christoph J. Grundmann and Gerhard Ottmann, Columbus, Ohio, assignors to Olin Mathieson Chemical Corporation, a corporation of Virginia No Drawing. Application May 10, 1955,
Serial No. 507,472

3 Claims. (Cl. 260—242)

This invention relates to novel chemical compounds and compositions containing these compounds which are useful in controlling the growth of soil and foliage fungi. More particularly, the compounds are 2,4-diamino-6-ethylmercury-thio-1,3,5-triazine and 2-amino-4,6-bis-(ethylmercury-thio)-1,3,5-triazine which are represented by the following formula:

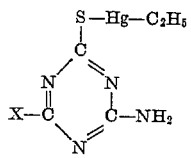

where X is one of the group —$NH_2$ and —S—Hg—$C_2H_5$.

Fungi in the soil can be responsible for failure of plants to emerge from soil or to survive diseases after sprouting. Soil fungi are responsible for considerable economic loss. Furthermore, these soil fungi are different species from those which infect and damage foliage and are not usually controlled by chemical agents active against foliage fungi. The effectiveness of chemicals on both soil and foliage fungi is limited, and the same chemicals are not generally considered to be of commercial importance in both fields. For instance, many copper compounds and tetramethylthiuram disulfide are generally rated as foliage fungicides and seed protectants respectively. The former type compound has not been accepted for commercial applications in controlling the important soil fungi, such as Fusarium, Pythium, Phytophthora, Rhizoctonia, Sclerotium and Sclerotinia, and the latter does not satisfactorily control late (post emergence) phases of the diseases caused by soil fungi. Pentachloronitrobenzene is not accepted as a foliage fungicide although it has some specificity. It is classified as a soil fungicide and in addition has excellent seed protectant qualities for certain specific uses, such as for the control of dwarf bunt (*Tilletia caries*). On the other hand, the compositions of this invention are effective on a number of the soil fungi, such as *Streptomyces scabies*, Rhizoctonia, Sclerotinia, Sclerotium and *Plasmodiophora brassicae*, and also on foliage fungi.

When used in accordance with our invention the aminoethylmercury-thio-1,3,5-triazine can be applied to the soil in accordance with procedures which are known to the art. Thus we can prepare a concentrate containing from about 50 to 95 percent by weight of 2-amino-4,6-bis-(ethylmercury-thio)-1,3,5-triazine in admixture with from 50 to 5 percent by weight of a diluent powder or solid carrier, for example, attapulgite clay, pyrophyllite or Celite (proprietary diatomaceous clay). For example, we can prepare a concentrate composed of 80 percent by weight of the substituted triazine and 20 percent by weight of pyrophillite. Concentrates are particularly useful in formulating more dilute mixtures for application to the soil.

A particularly convenient composition falling within the scope of our invention is a wettable powder containing, for example 75 percent by weight of 2-amino-4,6-bis(ethylmercury-thio)-1,3,5-triazine combined with 15 percent by weight of a fine clay diluent and 10 percent by weight of a wetting agent. Suitable wetting agents include anionics, such as salts of alkyl-benzene sulfonates, for example, sodium decylbenzene sulfonate or sodium dodecyl benzene sulfonate, or non-ionics, such as polyoxyethylated tall oil or a polyoxyethylated alkylphenol. The wettable powder is suitably diluted with water before application to the soil. For example, depending upon conditions, 5 pounds of a wettable powder containing 75 percent by weight of one of the above-described triazines can be dispersed in 10 gallons of water to provide a composition suitable for the treatment of one acre of soil.

A 25 percent by weight emulsifiable concentrate is another example of a composition which can be used in accordance with our invention. The proportion of active ingredients in such a concentrate will usually vary from about 5 to 50 percent by weight of the substituted triazine, and the composition will contain, in addition, a solvent and a compatible emulsifying agent. Suitable emulsifying agents include polyoxyethylated alkylphenols, anionic alkane sulfonates and non-ionic polyoxyethylated fatty acid concentrates. As solvents, xylene or methylated naphthalenes can be used. An example of an emulsifiable concentrate is one containing from 25 percent by weight of 2-amino-4,6-bis(ethylmercury-thio)-1,3,5-triazine, 70 percent by weight of xylene and 5 percent by weight of a polyoxyethylated alkyl phenol. In use, the emulsifiable concentrate containing about 2 pounds of fungicide per gallon is diluted with water and applied to the soil at the rate of about 2.5 pounds of active ingredient per acre.

For dusting on the soil, a composition which can be used contains from 5 to 50 percent of active fungicide diluted with a finely divided solid dust base, for example, attapulgite clay, pyrophyllite or Celite. The dust base should be finely divided preferably in the 10–40 micron range. If desired, a sticker can be also included in the dusting composition. Depending upon conditions, the dust will generally be applied at a rate of about 25–75 pounds of active ingredients per acre. The rate of application of active ingredients described above are suitable for row crops, where the fungicide is applied directly to the soil, usually at the time of planting. When the above described compositions are to be broadcast, for example, by plane or helicopter, the rate of application of active ingredient should be about 3 to 5 times that indicated for application in rows.

The following examples indicate in detail the practice of our invention and are not to be considered as limiting.

EXAMPLE I

*2,4-diamino-6-ethylmercury-thio-1,3,5-triazine*
*(s-ethylmercury thioammeline)*

The potassium salt of 2,4-diamino-6-mercapto-1,3,5-triazine (thioammeline) was prepared by heating 90 grams of thioammeline with 600 milliliters of 50 percent aqueous potassium hydroxide until a solution was obtained. Upon cooling to room temperature, the potassium thioammeline crystallized. It was then filtered off and washed with 100 milliliters of methanol. A mixture comprising 50 milliliters of methanol and 6.8 grams of potassium thioammeline dissolved in 60 milliliters of water was poured into a boiling solution of 11 grams of ethylmercury bromide in 1200 milliliters of methanol. The resulting solution was kept at 40°–45° C. for 12 hours, while a heavy precipitate formed, after which the whole was cooled to room temperature. The ethylmercury thioammeline was filtered off and washed with 100 milliliters of methanol. Yield:

10.1 grams of a light-gray micro-crystalline powder (77 percent of theory).

|  | N | Hg |
|---|---|---|
| Calculated for $C_5H_9N_5SHg$ | 18.84 | 54.00 |
| Found | 19.03 | 51.17 |
|  | 18.94 | 51.00 |

As a measure of its fungicidal activity, s-ethylmercury thioammeline was tested for inhibition of spore germination of treated spores of the plant pathogen, Monilinia fructicola. The test was conducted by incubating various dilutions of the component to be tested with spores in a nutrient medium at 20° C. for 24 hours. The amount of inhibition was calculated from a count of the spores in the various test and control dilutions and is expressed as the ED-50 dose, i. e., the minimum dose in parts per million resulting in 50 percent inhibition of germination. The ED-50 dose for s-ethylmercury thioammeline was 0.36 p. p. m. indicating that very low dilutions of the compound are effective in preventing spore germination and achieving excellent fungicidal results. For comparison, the corresponding ED-50 dose for bis-ethylmercury perthiocyanate, a proposed mercurial fungicide containing 66 percent of mercury, was 0.50 p. p. m. On the basis of mercury content, the s-ethylmercury thioammeline is 1.5 times as effective.

The effectiveness of s-ethylmercury thioammeline against anthracnose of cucumber foliage was also determined. In this test, 15-20 susceptible cucumber plants are sprayed with each concentration of the chemical tested. After the deposit is dry, all treated plants and untreated controls are inoculated with a suspension of spores of Colletotrichum lagenarium. The plants are kept at 20° C. in a chamber, at 100 percent relative humidity, for 36 hours and then in the greenhouse until lesions develop on the leaves. The amount of disease control is calculated from a count of the lesions on treated and untreated plants, and is expressed as the ED-95, i. e., the dose in p. p. m. which controls 95 percent of disease symptoms.

With respect to the above described control foliage test, the following ED-95 values were obtained:

| | ED-95, p. p. m. |
|---|---|
| s-Ethylmercury thioammeline | 0.18 |
| Bis-ethylmercury perthiocyanate | .31 |

Comparing the results on the basis of mercury content, s-ethylmercury thioammeline is twice as effective in the cucumber anthracnose test, as bis-ethylmercury perthiocyanate.

EXAMPLE II

*2 - amino-4,6-bis(ethylmercury-thio)-1,3,5-triazine (bis-ethylmercury dithiomelanurenic acid)*

A solution of 4.4 grams of 2-amino-4,6-dimercapto-1,3,5-triazine (dithiomelanurenic acid) and 2.2 grams of sodium hydroxide in 50 milliliters of 50 percent ethanol was added dropwise with stirring to a hot solution of 17 grams of ethylmercury bromide in 1700 milliliters of methanol. The clear solution was kept at 60° C. for 4 to 5 hours, after which it was cooled to room temperature and allowed to stand overnight while a white-gray precipitate formed. This bis - (ethylmercury) - dithiomelanurenic acid was separated by filtration and washed three times with 250 milliliters of methanol. Air dried, it amounted to 13 grams or 76 percent of theory.

We claim:
1. The compounds of the formula:

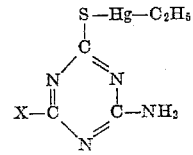

wherein X is selected from the group consisting of —$NH_2$ and —S—Hg—$C_2H_5$.

2. The compound of claim 1 wherein X is —$NH_2$.
3. The compound of claim 1 wherein X is

No references cited.